Figure 1:
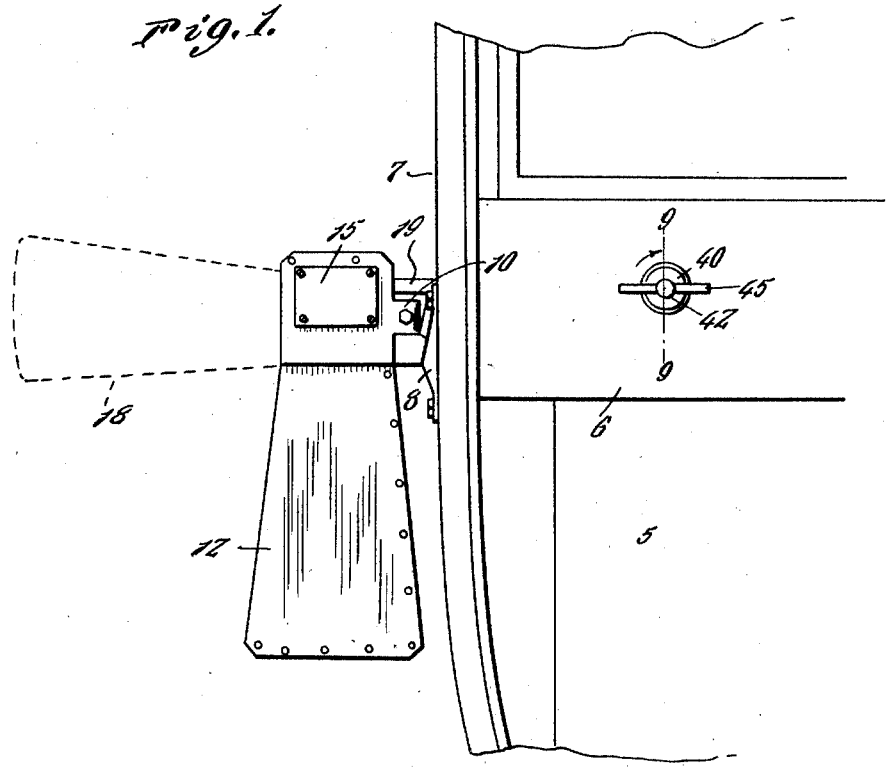

May 14, 1929.  R. C. KEDDY  1,712,887
VEHICLE SIGNAL
Filed May 28, 1928   4 Sheets-Sheet 1

Inventor
Roy C. Keddy

By Clarence A. O'Brien
Attorney

May 14, 1929.  R. C. KEDDY  1,712,887
VEHICLE SIGNAL
Filed May 28, 1928  4 Sheets-Sheet 2
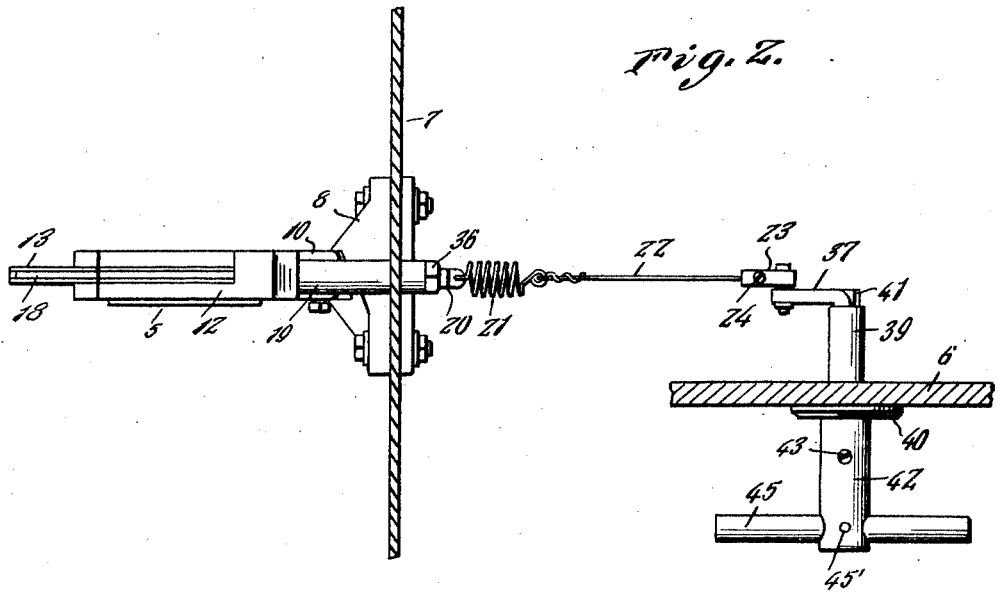
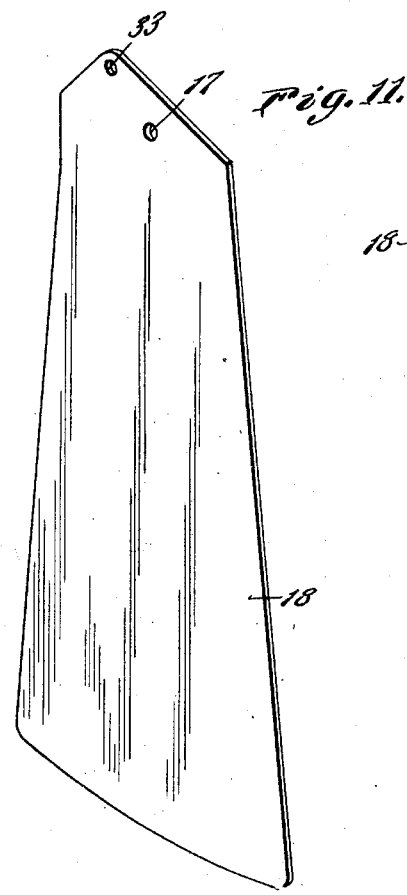
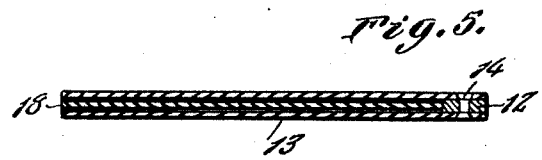
Inventor
Roy C. Keddy
By Clarence A. O'Brien
Attorney May 14, 1929.    R. C. KEDDY    1,712,887
VEHICLE SIGNAL
Filed May 28, 1928    4 Sheets-Sheet 3
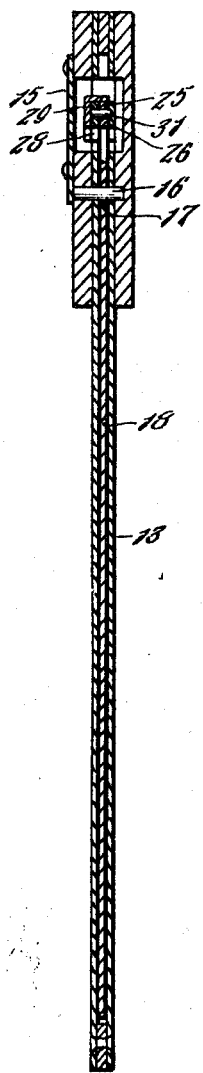
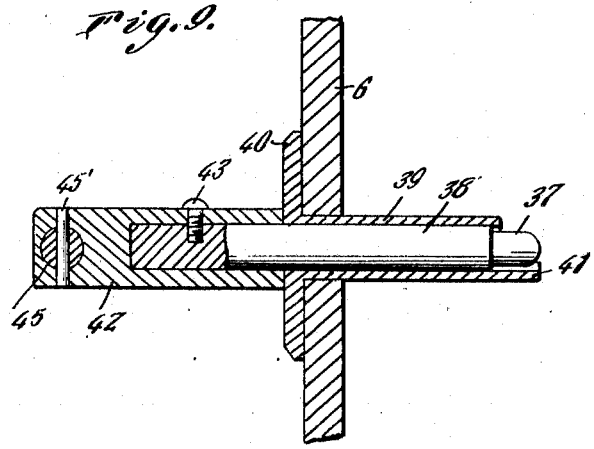
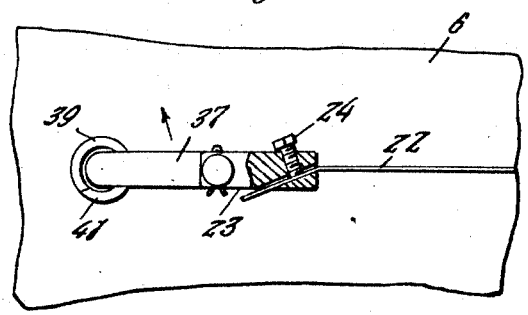
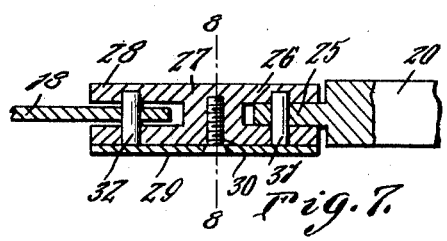
Inventor
Roy C. Keddy
By Clarence A. O'Brien
Attorney

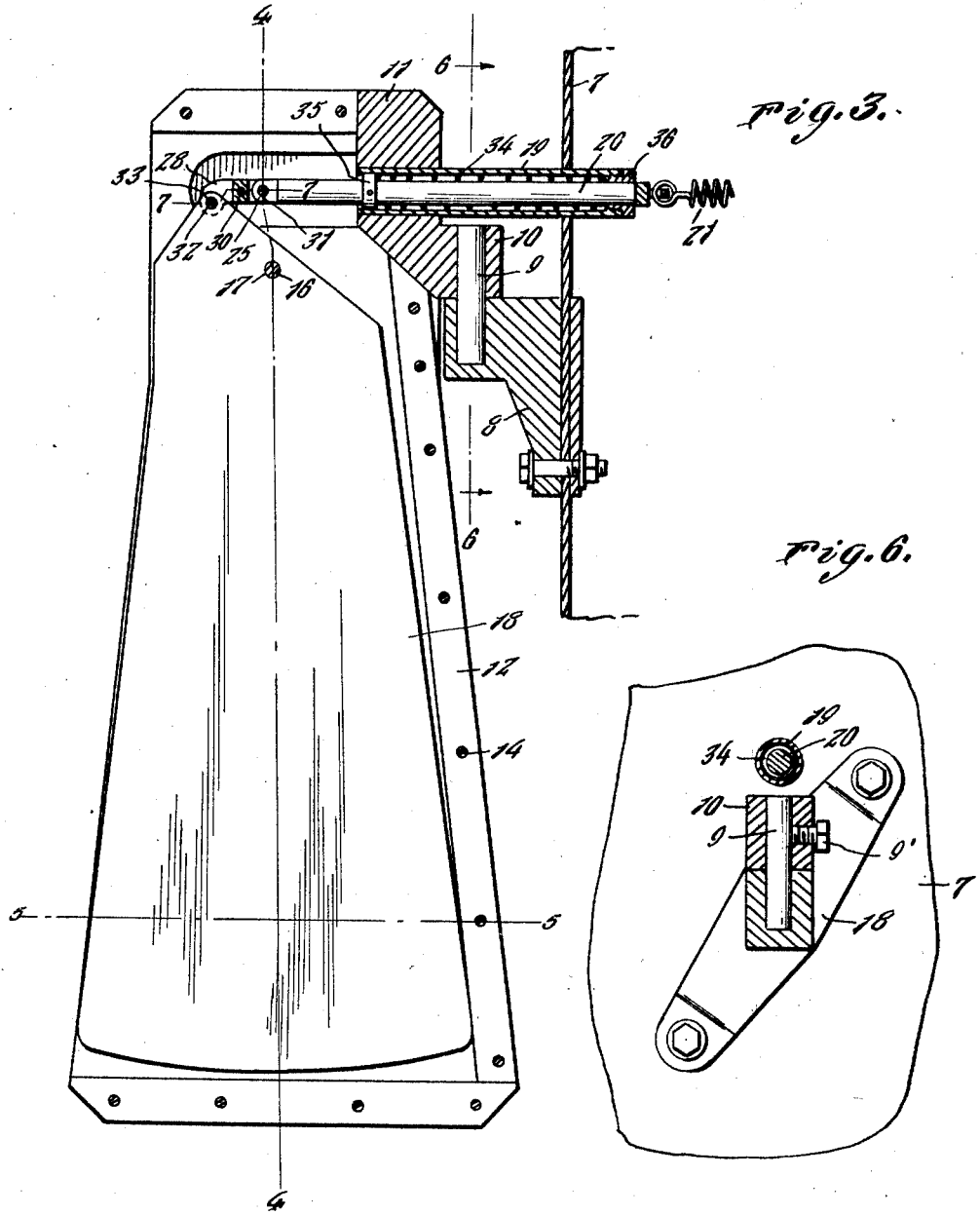

Patented May 14, 1929.

1,712,887

UNITED STATES PATENT OFFICE.

ROY C. KEDDY, OF WEST SOMERVILLE, MASSACHUSETTS.

VEHICLE SIGNAL.

Application filed May 28, 1928. Serial No. 281,141.

The present invention relates to vehicle signals of the semaphore type and has for its principal object to provide a device of this character operable by the driver of a vehicle to indicate to cars approaching from either direction of his intention of turning or to signal to the drivers of vehicles in the rear of his intention of pulling out from the curb or of passing another machine while on the road.

A still further object of the invention is to provide a pivotally mounted semaphore arm operable from a convenient position within the vehicle by the driver thereof for swinging the arm upwardly into a horizontal or signalling position and to provide a sheath for the semaphore arm attached to the outside of the vehicle for enclosing the semaphore arm when out of signalling position.

A still further object is to provide a device of this character of a simple and practical construction, which is neat and attractive in appearance, efficient and reliable in performance, which may be easily and quickly installed in operative position upon the vehicle without necessitating any changes in the construction thereof, relatively inexpensive to manufacture and otherwise well adapted for the purposes for which the same is intended.

Figure 12:
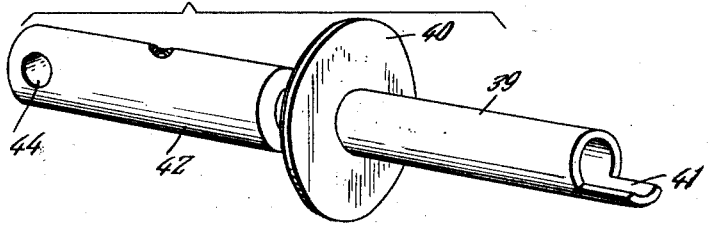
Figure 13:
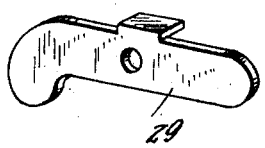

Other objects and advantages reside in the special construction, combination and arrangement of the various elements forming the invention as more fully hereinafter described and claimed, reference being had to the accompanying drawings forming part hereof, wherein like numerals refer to like parts throughout, and in which:

In the drawings:

Figure 1 is a fragmentary elevational view of a vehicle body showing the signal in operative position thereon, Figure 2 is a fragmentary horizontal sectional view through a portion of the body of the vehicle, and showing a plan view of the signalling device mounted in operative position thereon, Figure 3 is a rear elevational view of the sheath for the semaphore arm with the cover plate removed and showing the position of the arm therein, the mounting for the sheath being shown in vertical section, Figure 4 is a vertical transverse sectional view through the sheath and semaphore arm taken along a line 4—4 of Figure 3, Figure 5 is a transverse sectional view taken along a line 5—5 of Figure 3, Figure 6 is a vertical sectional view through the mounting for the sheath taken along a line 6—6 of Figure 3, Figure 7 is a fragmentary sectional view through the pivotal mounting for the semaphore arm taken along a line 7—7 of Figure 3, Figure 8 is a transverse sectional view through the mounting for the semaphore arm taken along a line 8—8 of Figure 7, Figure 9 is a vertical sectional view through the operating handle taken along a line 9—9 of Figure 1, Figure 10 is a detail in elevation of the crank arm formed on the inner end of the operating handle, Figure 11 is a perspective view of the semaphore arm, Figure 12 is a group perspective view of the mounting for the crank arm, and Figure 13 is a perspective view of the plate forming an operating connection with the semaphore arm.

Referring now to the drawing in detail, wherein for the purpose of illustration I have disclosed a preferred embodiment of my invention, the numeral 5 designates generally the body of an automobile or other motor vehicle having an instrument board or panel 6 arranged in the driver's compartment thereof.

To a portion of the outside of the body, preferably forward of the left hand door shown at 7 is fixedly attached a supporting bracket 8 having a downwardly extending recess formed in its upper edge and within which is fixedly seated a dowel pin 9 extending upwardly through a shoulder 10 formed at the rear edge 11 of a semaphore housing or sheath 12 which is prevented from turning on pin 9 by a set screw 9'.

The sheath is formed of a pair of slightly spaced apart sections 13, open along one edge and suitably secured to each other about the other edges thereof by means of screws, rivets or the like 14.

The upper portion of the rear face of the sheath is provided with an opening having a cover plate 15 fitted thereover said cover serving to retain a pin 16 in opening 17 formed adjacent the upper edge of a semaphore arm 18 and providing a pivotal mounting for the upper edge thereof whereby to permit the semaphore arm to swing outwardly through the open edge of the sheath and to be suspended from said pin when out of signalling position between the section 13 of the sheath.

To the rear upper edge 11 of the sheath is formed an opening within which a sleeve 19 is fitted, said sleeve extending through the side 7 of the vehicle inwardly thereof. A rod 20 is slidably mounted in the sheath with its inner end attached to a coil spring 21 and with a flexible operating member 22 attached at one end to said spring and with its opposite end adjustably attached to a link 23 and at the outer end said rod is provided with a reduced extension 25 disposed between the bifurcated end 26 of a double ended block 27 likewise having its opposite end bifurcated as shown at 28.

To one side of the block 27 is secured a plate 29 by an attaching screw 30, the abutting face of the plate retaining a pair of pins 31 and 32 respectively in inserted position in openings at the bifurcated ends 26 and 28 of the block, the pin 31 being also inserted through an alined opening formed in the reduced extension 25 of the rod 20.

The pin 32 is also inserted through an opening 33 formed in the upper outer edge of the semaphore arm 18, such edge of the semaphore arm being disposed between the bifurcated end 28 of the block 27. It will thus be apparent that by reason of this connection the semaphore arm 18 may be swung upwardly and outwardly upon an inward movement of the rod 20.

Arranged upon the rod 20 within the sleeve 19 is a coil spring 34 having its outer end arranged in abutting relation with a collar 35 secured to the rod and its inner end disposed in abutting relation with a plug 36 threaded in the inner end of the sleeve.

The spring 34 is constructed of sufficient tension to normally force the rod 20 outwardly thereby to maintain the semaphore arm 18 in a downwardly suspended position within the sheath.

The link 23, to which the inner end of the flexible member 22 is attached, is carried by a crank arm 37 formed at the outer end of a shank 38 rotatably supported in a tubular housing 39 fitted in an opening in the instrument board 6 of the vehicle.

One end of the tubular housing 39 terminates in an escutcheon plate 40 which is held onto the front surface of the instrument panel by bolts or screws, and the opposite end of the tubular housing is provided with an extension 41 adapted to form a stop for the crank arm 37 whereby to prevent the complete rotation thereof.

The end of the shank 38 opposite from the crank 37 extends entirely through the tubular housing 39 and is fitted within a socket member 42 extending outwardly from the escutcheon plate 40 and retained therein by a set screw 43. The outer end of the socket member 42 is provided with a transversely extending opening 44 through which a handle 45 is inserted and held by pin 45' whereby to provide for the operation of the crank 37 through the socket member 42 and shank 38.

When assembling the parts in operative position the crank 37 is extended in a direction toward the rod 20 when the semaphore arm is disposed out of signalling position. Accordingly by turning the handle 45 in a clockwise direction as shown by the arrow in Figure 1 of the drawing the crank 37 will be raised upwardly and serving to pull the rod 20 inwardly against the tension of the spring 34 and consequently to swing the lower end of the semaphore arm 18 upwardly and outwardly in a horizontal position as shown by the dotted lines in Figure 1 of the drawings.

By continuing to turn said handle 45 against the yielding action of the spring 21, until crank 37 is carried past dead center and comes to rest against the far side of extension 41. The semaphore arm is held in this horizontal position until the handle 45 is forced in a counter clockwise direction past dead center to a point where the tension of the springs will swing the semaphore arm back into its sheath.

It is obvious that my invention is susceptible to various changes and modifications in construction without departing from the spirit of the invention or the scope of the appended claims, and I accordingly claim all such forms of the device to which I am entitled.

Having thus described my invention, what I claim as new is:

1. A signalling device comprising a pivotally mounted signalling element, an operating handle therefor, and means operatively connecting the said handle with said signalling elements, whereby to swing the latter upwardly, and outwardly, said means comprising a shaft for the handle having a crank formed thereon, a flexible member adjustably attached at one end to the crank, a sectional rod forming a connection for the opposite end of the member with the signalling elements, and a tubular housing for the shaft having an extension at one end arranged to limit the crank to a partial revolution and adapted upon the movement of the crank into one extreme position to retain the arm in signalling position.

2. A signalling device comprising pivotally mounted signalling elements, an operating handle therefor, and spring means operatively connecting said handle with the upper outer edge of said signalling element whereby to swing the latter upwardly and outwardly, said means comprising a shaft for the handle having a crank formed thereon, a flexible member adjustably attached at one end to the crank, a sectional rod forming a connection for the opposite end of the member with the signalling element, a tubular housing for the shaft having an extension at one end arranged to limit the crank to a partial revolution, and adapted upon the movement of the crank in one extreme position to retain the signalling element in signalling position, and spring means interposed between the crank and said element yieldably retaining the latter in either of its extreme positions.

3. A signalling device comprising a pivotally mounted signalling element, means operatively connecting the same for upward and outward swinging movement and including a crank having an operating handle attached thereto, a flexible member adjustably attached at one end to the crank, a sectional rod forming a connection for the opposite end of said flexible element with said signalling element, and spring means urging the crank in one direction upon its movement into a predetermined position, and stop means for the crank adapted for retaining the same against movement in either direction when in either of its opposite positions except through the operation of said handle.

In testimony whereof I affix my signature.

ROY C. KEDDY.